Patented Oct. 9, 1945

2,386,509

UNITED STATES PATENT OFFICE 2,386,509

MODIFICATION OF STARCH

Thomas John Schoch, La Grange, Ill., assignor to Corn Products Refining Company, New York, N. Y., a corporation of New Jersey No Drawing. Application November 29, 1943, Serial No. 512,259

8 Claims. (Cl. 127—32)

This invention relates to the modification of starch, and more particularly to the control of the gelatinization of starch and various phenomena related thereto, including the pasting of starch, and the swelling and disintegration of starch granules.

When raw starch granules are heated in the presence of substantial quantities of water above certain temperatures they undergo various changes. One of the first of these which becomes manifest is the loss of the characteristic Maltese cross pattern which is observed when raw starch granules are examined under a polarizing microscope. This is generally referred to as loss of birefringence, and the latter expression as used herein is to be so understood.

The gelatinization of starch is an expression to which various meanings have been attached in the technical literature dealing with the subject of amylaceous materials. Thus gelatinization has been described in various ways and measured or determined with reference to various standards. For present purposes, it is to be understood that loss of birefringence is taken to be the measure of gelatinization. As starch granules are heated at temperatures progressively higher than that at which loss of birefringence first becomes apparent, i. e. apparent in some of the granules, increasing proportions of the starch granules undergo the changes which lead to this manifestation of their modification. In general it may be said that the larger starch granules first lose birefringence and that the smaller starch granules—since the granules are of various sizes—lose birefringence only thereafter. Thus it may be said that gelatinization, as that term is here used, occurs throughout a limited range of temperatures, rather than at a specific temperature, although references to specific gelatinization temperatures are quite common in the literature. Usually the specific temperatures so referred to are average figures, indicating the midpoint of the gelatinization range. This range generally is of the order of about 5–10° C.

Thus in the case of corn starch, which may be taken as illustrative, loss of birefringence is first noted, with respect to a few starch granules, i. e. the larger ones, at about 64–65° C. At 66° C., as heating is continued, approximately 25% of the starch granules have lost birefringence, and similarly at 68° C., approximately 70% of the starch granules have lost birefringence. At 70° C., only a few small birefringent granules remain, and the starch may then be said to be substantially completely gelatinized. Accordingly, in the case of corn starch the gelatinization range of temperatures may be designated as about 65–70° C. Similarly, the gelatinization range of tapioca starch has been determined as 60–70° C., that of wheat starch as 59–64° C., and that of waxy maize starch as 65–74° C.

As the heating of gelatinized starch is continued so as to raise the temperature progressively above the gelatinization range (as herein defined) the swelling of the starch granules, indicated at an early stage by loss of birefringence, continues. There then becomes evident, as a consequence of such progressive swelling, a sharp and substantial increase in viscosity. The temperature at which this effect becomes pronounced will depend upon the particular type of starch involved. So far as concerns the determination of the temperature at which this effect begins to occur in the case of any particular starch, this will depend also upon the means employed to detect or measure changes in paste viscosity. Some devices used for this purpose are more sensitive to viscosity changes than others, and thus tend to indicate lower temperatures at which this viscosity effect occurs than other devices less sensitive to viscosity changes.

The point at which sharp and substantial increase in paste viscosity begins to become apparent is herein referred to as the "pasting temperature." As determined by use of the Brabender Amylograph, a recording viscometer which automatically plots paste viscosity as a function of constantly rising paste temperature, the pasting temperature of gelatinized corn starch is 80° C., that of gelatinized tapioca starch is 64° C., that of gelatinized wheat starch is 90° C., and that of gelatinized waxy maize starch is 70° C. All pasting temperatures herein specifically referred to are as determined by use of the Brabender Amylograph.

As heating to still higher temperatures, i. e. temperatures above the pasting temperature, is continued, the starch granules undergo further and progressive swelling and, if the temperature be carried sufficiently high, eventually burst or disintegrate.

The present invention is based upon the discovery that when starch is heated to elevated temperatures in the presence of water and effective amounts of certain starch modifying adjuncts, which will be more particularly described, gelatinization, pasting, swelling and disintegration of the starch granules may be brought about at temperatures other than would normally, i. e. in the absence of such adjuncts, be required to produce like effects. By practice of the present invention, the gelatinization range may be depressed by as much as 15° C., and the pasting temperature by as much as 25° C. Correspondingly, the degree to which swelling of the starch granules is affected by the invention is most striking; for example, in certain instances practice of the invention makes possible the same degree of swelling at a temperature of 60° C. as would normally, i. e. in the absence of the adjuncts here involved, be effected only by heating to a temperature of 80° C. Similarly, the invention promotes the bursting or disintegration of starch granules at temperatures below those at which like effects would normally occur.

The adjuncts which have been found effective for the purposes of the present invention are the saturated monohydric aliphatic alcohols containing from 1 to 6 carbon atoms. Both normal primary alcohols and their various isomers may be used, although, generally speaking, the former are to be preferred as the effects thereof appear to be more pronounced. Any alcohol, within the limits indicated, may be employed. Thus one may use any of the following alcohols, or mixtures thereof:

Methyl alcohol
Ethyl alcohol
n-Propyl alcohol
Isopropyl alcohol
n-Butyl alcohol
Secondary butyl alcohol
Isobutyl alcohol
Tertiary butyl alcohol
n-Amyl alcohol
Secondary butyl carbinol
Isobutyl carbinol
Diethyl carbinol
Tertiary amyl alcohol
n-Hexyl alcohol Of the various alcohols which may be so employed, however, it is preferred to use butanol (n-butyl alcohol).

In practicing the invention in a preferred form, a quantity of starch to be treated is suspended in water at room temperature or the like. The suspension also has incorporated therein an effective amount of an alcohol of the class described, e. g. butanol. The suspension of starch in the alcohol-water system (solution or mixture, as the case may be) is then heated to a temperature sufficiently high to bring about desired changes in the starch. As the temperature is progressively increased, the starch granules pass through four general stages which may be characterized as gelatinization, pasting, swelling and disintegrating or bursting. As will be understood, the extent to which these changes, or any of them, are effected, may be controlled by arresting increase of the temperature at any appropriate point. The modification of starch granules through these various stages of development is such that the various stages cannot be sharply distinguished from one another in all instances, and the designation of these stages is, therefore, admittedly arbitrary. For purposes of the present discussion it then becomes desirable to assign particular significance to some of these designations so far as this may fairly be done; and accordingly the expressions "gelatinization" and "pasting" are to be understood herein as defined hereinabove. As these various changes occur, when starch is modified in accordance with the invention, it will be observed that each change takes place at a temperature lower, and usually substantially lower, than the temperature at which the same would occur if the alcohol were not present.

To illustrate the relative efficacy of various alcohols within the purview of the invention, as reflected by the depression of gelatinization and pasting temperatures afforded by their use, reference will be had to Table I. This table sets forth the gelatinization and pasting temperatures obtaining when corn starch is heated with water in an amount sufficient to permit gelatinization, and with alcohol present to the extent of 3% of the total volume of water and alcohol. In each case the starch was present in the amount of 35 g., and the total volume of alcohol and water was 450 ml.:

Table I

| Alcohol | Gelatinization range °C. | Pasting temperature °C. |
|---|---|---|
| None (control) | 65–70 | 80 |
| Methyl | 64–70 | 74 |
| Ethyl | 64–70 | 72 |
| n-Propyl | 61–68 | 73 |
| Isopropyl | 63–69 | 73 |
| n-Butyl | 57–66 | 74 |
| Isobutyl | 60–66 | 69 |
| Secondary butyl | 61–68 | 72 |
| Tertiary butyl | 63–68 | 73 |
| n-Amyl | 59–67 | 74 |
| Secondary butyl carbinol | 62–68 | 70 |
| Isobutyl carbinol | 60–67 | 70 |
| Diethyl carbinol | 60–67 | 70 |
| Tertiary amyl | 61–68 | 71 |
| n-Hexyl | 62–69 | 77 |

The extent of depression of the gelatinization and pasting temperatures is dependent upon the concentration of alcohol employed, i. e. upon the relative proportions of alcohol and water present. In general, as the concentration of alcohol is increased, within limits, the depression of the gelatinization and pasting temperatures is increased. The concentration of alcohol which is most effective for purposes of the invention will vary with the particular alcohol employed. Thus in the case of butanol, the depression will grow greater as the concentration of alcohol is increased up to 50% or more, the upper limit of the alcohol concentration being fixed only by the requirement that the butanol-water system still be capable of bringing about gelatinization of the starch. (As is well known, starch will not gelatinize when heated in the alcohols specified herein alone, nor in such alcohols containing only relatively small amounts of water.) The effect of butanol in various concentrations is illustrated by Table II, which tabulates the results obtained by heating 35 g. of corn starch in 450 ml. of butanol-water systems containing various concentrations of the alcohol expressed in terms of percent by volume on the basis of the total volume of alcohol and water.

Table II

| Concentration of butanol | Gelatinization range °C. | Pasting temperature °C. |
|---|---|---|
| 0% (control) | 65–70 | 80 |
| 1 | 63–68 | 78 |
| 3 | 57–66 | 74 |
| 7 | 54–62 | 62 |
| 15 | 54–61 | 60 |
| 25 | 52–60 | 58 |
| 50 | 50–60 | 55 |

Although, as will be noted, depression of the gelatinization and pasting temperatures is enhanced by increasing the butanol concentration beyond 7%, this concentration is, for all practical purposes, regarded as optimum, inasmuch as above this concentration relatively large amounts of alcohol are required to effect relatively slight increases in the depression of gelatinization and pasting temperatures.

In the case of ethanol, concentrations up to 25% by volume (on basis above set forth) may be employed. A concentration of about 10% effects maximum depression of the gelatinization and pasting temperatures. As the ethanol concentration is increased up to about 10%, the depression of the gelatinization range and pasting temperature increases. As the concentration of ethanol is increased from about 10% to about 25%, the gelatinization range and pasting temperatures begin to rise above the levels of maximum depression; and when concentrations of ethanol in excess of 25% are employed, gelatinization and pasting occur only at temperatures higher than would produce these changes in the presence of water alone.

In the case of each of the other alcohols which may be employed, it will be found that there is similarly an optimum range of alcohol concentration, as concerns depression of the gelatinization range and pasting temperatures. Those skilled in the art will have no difficulty in determining the optimum concentration of alcohol to be employed under any given set of operating conditions, but it may be added that in general it will be found desirable to use a small amount of alcohol, e. g. about 1%–15% by volume based upon the total volume of alcohol and water.

As concerns the concentration of starch, it is to be observed that the same considerations apply as are involved in the gelatinization of starch generally. Substantially complete gelatinization of a given quantity of starch requires the presence of a certain minimum amount of water, and involves loss of birefringence of substantially all of the starch granules. As starch is heated to gelatinizing temperature in the presence of amounts of water inadequate to bring about such gelatinization, only a portion of the starch granules lose birefringence; the remainder, while perhaps altered somewhat in certain respects, does not lose birefringence. The presence of alcohol as contemplated by the present invention involves no substantial departure from these principles. The function of the alcohol, as herein described, is to lower the temperatures at which there occur the various modifications which starch undergoes when heated in the presence of water, and this appears to be the salient function and effect of the alcohol when used in preferred concentrations. Accordingly, in practicing the invention, starch and water may be used in any relative proportions normally employed to effect gelatinization, pasting or the like, without regard to the presence or concentration of the alcohol (provided that, as noted above, the alcohol concentration is not so high as to prevent gelatinization).

The heating of starch and water to elevated temperatures, e. g. to temperatures above those at which gelatinization and pasting of the starch occur, brings about a thinning of the starch paste by reason of the gradual disintegration or bursting of the starch granules, in what has been designated herein as the fourth progressive stage in the modification of starch granules by heat in the presence of water. Employment of the invention permits the changes which occur in all of these stages to take place at lower temperatures than would normally be required therefor. Hence the heating of pasted starch above the pasting temperature, in the presence of alcohol as contemplated by the invention, is effective to bring about swelling of the starch granules to greater degree at any given temperature than if the alcoholic adjuncts of the invention were not employed. As heating to still higher temperatures is effected, in the presence of alcohol as contemplated by the invention, this brings about disintegration or bursting of the starch granules, and hence thinning of the starch paste, to greater degree at any given temperature than if the alcoholic adjuncts of the invention were not employed.

In general, gelatinization and pasting of the starch occur at temperatures below the boiling points of the alcohols employed, or of their respective azeotropic mixtures with water, as the case may be. Thus no special precautions need generally be observed to prevent undue loss of alcohol in connection with gelatinizing and pasting operations, although normal loss by evaporation will occur to a limited and slight extent. As pasted starch is heated above the pasting temperature, however, the temperatures employed may exceed the boiling points of some of the alcohols used, or of their azeotropic mixtures with water. Evaporation and loss from the system of the alcohol may be tolerated if it is not desired to utilize the invention most effectively. However, if most efficient use for purposes of the invention is to be made of a given quantity of alcohol, it will be found desirable, whenever the boiling points of the alcohols used or of their azeotropic mixtures with water are exceeded, either to effect heating under reflux, or under pressure in a closed vessel. Normally, these precautions will be desirable only when starch pastes are heated above the pasting temperature, but may advantageously be observed whenever appreciable loss of alcohol by evaporation is to be expected and prevented.

The invention has application to starches of all types, among which may be mentioned the following: corn, tapioca, wheat and waxy maize.

The following examples will further illustrate the invention, it being understood, however, that these are intended as illustrative only and not in a limiting sense.

*Example 1.—Corn starch—butanol*

35 g. of corn starch is suspended in a butanol-water solution prepared by adding to 31.5 ml. of butanol sufficient water to total 450 ml. The suspension is heated with stirring to increasingly higher temperatures. Under such conditions the gelatinization range is found to be 54–62° C., and the pasting temperature to be 62° C. By way of contrast, if 35 g. of the same starch were heated in 450 ml. of water alone, the gelatinization range would be found to be 65–70° C., and the pasting temperature 80° C.

*Example 2.—Corn starch—butanol*

35 g. of corn starch is suspended in a butanol-water mixture prepared by adding to 225 ml. of butanol sufficient water to total 450 ml. The suspension is heated with agitation to increasingly higher temperatures. The gelatinization range is found to be 50–60° C. and the pasting temperature 55° C.

*Example 3.—Corn starch—n-amyl alcohol*

To 13.5 ml. of n-amyl alcohol there is added sufficient water to give a total volume of 450 ml. To this there is added 35 g. of corn starch and the suspension heated with stirring to increasingly higher temperatures. The gelatinization range is found to be 59–67° C. and the pasting temperature 74° C.

*Example 4.—Corn starch—ethanol*

35 g. of corn starch is suspended in 450 ml. of a 10% solution of ethanol in water, prepared by adding to 45 ml. of ethanol water in amount sufficient to total 450 ml. The suspension is heated, with stirring. A temperature of 68° C. is found to bring about substantially complete gelatinization, the gelatinization range being 62–68° C. Further heating to 73° C. brings about a sharp and substantial increase in the viscosity of the starch paste.

*Example 5.—Corn starch—diethyl carbinol*

To 13.5 ml. of diethyl carbinol there is added sufficient water to give a total volume of 450 ml. To this there is added 35 g. of corn starch and the suspension heated, with stirring, to increasingly higher temperatures. The gelatinization range is found to be 60–67° C., and the pasting temperature 70° C.

*Example 6.—Corn starch—commercial amyl alcohol*

To 31.5 ml. of the product sold commercially under the trade name "Pentasol," which is understood to consist of a mixture of various amyl alcohols, there is added sufficient water to give a total volume of 450 ml. To this there is added 35 g. of corn starch and the suspension heated, with stirring, to increasingly higher temperatures. The gelatinization range is found to be 58–66° C., and the pasting temperature 68° C.

*Example 7.—Tapioca starch—butanol*

35 g. of tapioca starch is suspended in 450 ml. of a 7% solution of butanol in water. The suspension is heated, with stirring, to increasingly higher temperatures. The gelatinization range is found to be 51–61° C., and the pasting temperature 56° C. By way of contrast, if 35 g. of the same starch were heated in 450 ml. of water alone, the gelatinization range would be found to be 60–70° C., and the pasting temperature 64° C.

*Example 8.—Waxy maize starch—butanol*

35 g. of waxy maize starch is suspended in 450 ml. of a 7% solution of butanol in water. The suspension is heated, with stirring, to increasingly higher temperatures. The gelatinization range is found to be 54–64° C., and the pasting temperature 62° C. If 35 g. of the same starch were heated in 450 ml. of water alone, the gelatinization range would be found to be 65–74° C., and the pasting temperature 70° C.

*Example 9.—Wheat starch—butanol*

35 g. of wheat starch is suspended in 450 ml. of a 7% solution of butanol in water. On heating as described in the previous examples, the gelatinization range is found to be 48–55° C., and the pasting temperature 66° C. If 35 g. of the same starch were heated in 450 ml. of water alone, the gelatinization range would be found to be 59–64° C., and the pasting temperature 90° C.

*Example 10.—Corn starch—butanol—low starch concentration*

10 g. of corn starch is added to 450 ml. of a butanol-water solution prepared as in Example 1 and the suspension heated as there described. The gelatinization range is found to be the same as in Example 1.

*Example 11.—Corn starch—butanol—high starch and alcohol concentrations*

50 g. of corn starch is intimately mixed with 50 ml. of water and 50 ml. of butanol. The resultant slurry is heated with agitation. It is found that gelatinization is initiated at 54° C., and that at 56° C. approximately 75% of the starch granules have lost birefringence. Continued moderate heating above 56° C. does not effect gelatinization of any appreciable part of the remaining portion of the starch granules; hence the upper limit of the gelatinization range is not to be set under the rather extreme conditions of this example. It is apparent, however, that loss of birefringence under the conditions of this example is initiated at a temperature substantially lower than the temperature of 65° C. at which loss of birefringence would be initiated in the absence of the alcohol.

I claim:

1. In the process of modifying starch by heating the same in the presence of water, the improvement which consists in contacting the starch undergoing modification with saturated aliphatic monohydric alcohol having 1 to 6 carbon atoms, in an amount effective to reduce the temperature at which the starch gelatinizes.

2. In the process of modifying starch by heating the same in the presence of sufficient water to effect gelatinization thereof, the improvement which consists in contacting the starch undergoing modification with saturated aliphatic monohydric alcohol having 1 to 6 carbon atoms in an amount effective to reduce the temperature at which the starch gelatinizes but not substantially exceeding about 15% by volume based upon the total volume of water and alcohol.

3. The process according to claim 2 wherein the alcohol is butanol.

4. The process according to claim 2 wherein the alcohol is butanol and is present to the extent of about 7% by volume, based upon the total volume of water and butanol.

5. The process according to claim 2 wherein the alcohol is n-amyl alcohol.

6. The process according to claim 2 wherein the alcohol is n-amyl alcohol and is present to the extent of about 3% by volume based upon the total volume of water and alcohol.

7. The process according to claim 2 wherein the alcohol is ethanol.

8. The process according to claim 2 wherein the alcohol is ethanol and is present to the extent of about 10% by volume based upon the total volume of water and ethanol.

THOMAS JOHN SCHOCH.